(12) United States Patent
Itaya (10) Patent No.: US 11,196,261 B2
(45) Date of Patent: Dec. 7, 2021

(54) CENTRALIZED VOLTAGE CONTROLLER AND CENTRALIZED VOLTAGE CONTROL SYSTEM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 30 days.

(21) Appl. No.: 16/483,495

(22) PCT Filed: Feb. 14, 2017

(86) PCT No.: PCT/JP2017/005313
§ 371 (c)(1),
(2) Date: Aug. 5, 2019

(87) PCT Pub. No.: WO2018/150461
PCT Pub. Date: Aug. 23, 2018

(65) Prior Publication Data
US 2020/0021132 A1  Jan. 16, 2020

(51) Int. Cl.
*H02J 3/18* (2006.01)
*H02J 13/00* (2006.01)
*H02J 3/12* (2006.01)

(52) U.S. Cl.
CPC .............. *H02J 3/1878* (2013.01); *H02J 3/12* (2013.01); *H02J 13/00007* (2020.01)

(58) Field of Classification Search
CPC .. H02J 13/00007; H02J 3/12; H02J 13/00034; H02J 3/1821; H02J 3/1878;
(Continued)

(56) References Cited

U.S. PATENT DOCUMENTS

2010/0090674 A1\* 4/2010 Bell ...................... G05B 15/02
  323/301
2010/0198422 A1\* 8/2010 Feng ...................... H02J 3/1828
  700/291
(Continued)

FOREIGN PATENT DOCUMENTS

JP  2013078237 A  4/2013
JP  2013229589 A  11/2013
(Continued)

OTHER PUBLICATIONS

International Search Report (with English translation) and Written Opinion issued in corresponding International Patent Application No. PCT/JP2017/005313, 9 pages (dated Mar. 14, 2017).
(Continued)

*Primary Examiner* — Alex Torres-Rivera
(74) *Attorney, Agent, or Firm* — Buchanan Ingersoll & Rooney PC (57) ABSTRACT

A centralized voltage controller according to the present invention includes a voltage distribution determination unit that calculates a controlled amount in each of a plurality of voltage controllers on the basis of a measured value of a voltage at each point on a distribution line, a tap position determination unit that determines a change amount of a tap position to be given to each of a plurality of local voltage control units on the basis of the controlled amount, and a tap-change-amount management unit that limits the change amount when receiving, from the local voltage control unit, a limit signal indicating that a tap position in the voltage controller controlled by the local voltage control unit is an upper limit or a lower limit of a settable range.

4 Claims, 7 Drawing Sheets

(58) Field of Classification Search
CPC ....... H02J 13/00016; H02J 3/18; Y02E 40/70; Y02E 40/30; Y04S 40/124; Y04S 40/121; Y04S 10/22
See application file for complete search history.

(56) References Cited

U.S. PATENT DOCUMENTS

| | | | |
|---|---|---|---|
| 2013/0294493 A1* | 11/2013 | Kono | H04B 3/10 375/232 |
| 2014/0288725 A1 | 9/2014 | Itaya | |
| 2015/0168965 A1* | 6/2015 | Baerthlein | H02P 13/06 323/340 |
| 2015/0233975 A1 | 8/2015 | Itaya | |
| 2015/0340862 A1 | 11/2015 | Kobayashi et al. | |

FOREIGN PATENT DOCUMENTS

| | | |
|---|---|---|
| JP | 5958869 B2 | 8/2016 |
| JP | 2016208640 A | 12/2016 |
| JP | 2017-028930 A | 2/2017 |
| WO | 2013065114 A1 | 5/2013 |

OTHER PUBLICATIONS

Office Action dated Jan. 21, 2021, by the India Patent Office in corresponding India Patent Application No. 201947031697 and English translation of the Office Action. (6 pages).

* cited by examiner

| LOCAL VOLTAGE CONTROL UNIT | TAP POSITION | PREVIOUS CHANGE AMOUNT | PROVISIONAL TAP POSITION |
|---|---|---|---|
| 11 | UNKNOWN | NONE | 3 |
| 15 | UNKNOWN | NONE | 3 |
| ⋮ | ⋮ | ⋮ | ⋮ |

FIG.7

UPPER LIMIT → — FIFTH STEP
— FOURTH STEP
— THIRD STEP
— SECOND STEP
LOWER LIMIT → — FIRST STEP

| LOCAL VOLTAGE CONTROL UNIT | TAP POSITION | PREVIOUS CHANGE AMOUNT | PROVISIONAL TAP POSITION |
|---|---|---|---|
| 11 | 5 | +2 | - |
| 15 | UNKNOWN | -1 | 2 |
| ⋮ | ⋮ | ⋮ | ⋮ |

FIG.10

CENTRALIZED VOLTAGE CONTROLLER AND CENTRALIZED VOLTAGE CONTROL SYSTEM

FIELD

The present invention relates to a centralized voltage controller and a centralized voltage control system for controlling voltage of a distribution system.

BACKGROUND

A distribution system is typically composed of a high voltage system and a low voltage system, where a receiving end of a general customer is connected to the low voltage system. An electric utility is obligated to maintain the voltage at the receiving end of the general customer within a proper voltage range. In the case of electricity reception of 100 V, for example, the electric utility is obligated to maintain the voltage between 95 V and 107 V. For this obligation, the electric utility regulates a controlled amount of a voltage controller connected to the high voltage system so as to maintain the voltage at the receiving end of the general customer. Note that in the following description, the distribution system refers to a high voltage system unless otherwise specified.

In the field of conventional voltage control of the distribution system, a local voltage control unit is widely available, the local voltage control unit performing autonomous decentralized voltage control on the voltage controller on the basis of measured information near the installation point of the voltage controller, and being integrated with the voltage controller or installed alongside the voltage controller.

Patent Literature 1 discloses a tap switching method for maintaining a secondary side voltage within a proper voltage range in autonomous decentralized voltage control. A voltage regulation device described in Patent Literature 1 calculates a predicted voltage value when a voltage is boosted by one tap and, if the predicted voltage value exceeds a proper upper limit voltage, changes a tap value by one tap to boost the secondary side voltage. In this manner, the voltage regulation device described in Patent Literature 1 can maintain the secondary side voltage near an upper limit within the proper voltage range, so that solar power generation can be interconnected at as high voltage as possible within a range in which a function of limiting output of a power conditioner does not work.

On the other hand, in recent years, load distribution of the distribution system has shown a trend toward large nonuniform fluctuation with time due to the diversification of way to use electricity, the spread of dispersion type electric power sources including one based on solar power generation, or the like. In response to this situation, it is becoming difficult to maintain proper voltage in the conventional voltage control of the distribution system.

For that reason, a method that performs centralized control on the voltage of the distribution system to achieve consistency across the system (hereinafter referred to as a centralized control method) is proposed in place of the autonomous decentralized voltage control method. In the centralized control method, a centralized voltage controller calculates an amount of regulation for a voltage controller in the distribution system.

CITATION LIST

Patent Literature

Patent Literature 1: Japanese Patent Application Laid-open No. 2013-78237

SUMMARY

Technical Problem

In patent literature 1, there is disclosed a voltage regulation device that maintains the secondary side voltage within a proper voltage range, but the voltage regulation device disclosed in Patent Literature 1 is a local voltage controller, and can only control a voltage in a distribution system with which the voltage regulation device is connected. It is therefore impossible to control the voltage in the distribution system to achieve consistency across the entire system. On the other hand, according to the centralized voltage control method, it is possible to control the voltage in the distribution system to achieve consistency across the entire system. To execute voltage control for a transformer type voltage controller in a centralized control method, it is necessary to know a tap position, that is, a tap value of the voltage controller. However, many of voltage controllers do not have any means for transmitting the tap value to outside. For this reason, the centralized voltage controller has to execute voltage control while the tap value is unknown, and may not execute appropriate voltage control in some cases.

The present invention has been achieved in view of the above circumstances, and an object of the present invention is to provide a centralized voltage controller that can execute appropriate voltage control in a centralized voltage control method even in the case where there is a voltage controller having no means for transmitting a tap value to outside.

Solution to Problem

In order to solve the above problems and achieve the object, the present invention provides a centralized voltage controller connected to two or more local voltage control units via a communication network, the local voltage control units controlling two or more transformer type voltage controllers, respectively, the transformer type voltage controllers being connected to a distribution line of a distribution system and controlling a voltage of the distribution line, the centralized voltage controller comprising: a calculation unit to calculate a controlled amount in each of the voltage controllers on the basis of a measured value of a voltage at each point on the distribution line. The centralized voltage controller further comprises: a command unit to determine a change amount of a tap position to be given to each of the local voltage control units on the basis of the controlled amount; and a limiting unit to limit the change amount when receiving, from the local voltage control unit, a limit signal indicating that a tap position of the voltage controller controlled by the local voltage control unit is an upper limit or a lower limit of a settable range in which the tap position can be set.

Advantageous Effects of Invention

The centralized voltage controller according to the present invention has an advantageous effect that it is possible to execute appropriate voltage control in a centralized voltage control method even in the case where there is a voltage controller having no means for transmitting a tap value to outside.

DESCRIPTION OF EMBODIMENTS

A centralized voltage controller and a centralized voltage control system according to an embodiment of the present invention are now described in detail with reference to the drawings. Note that the present invention is not necessarily limited by the embodiment.

Embodiment

Figure 1:
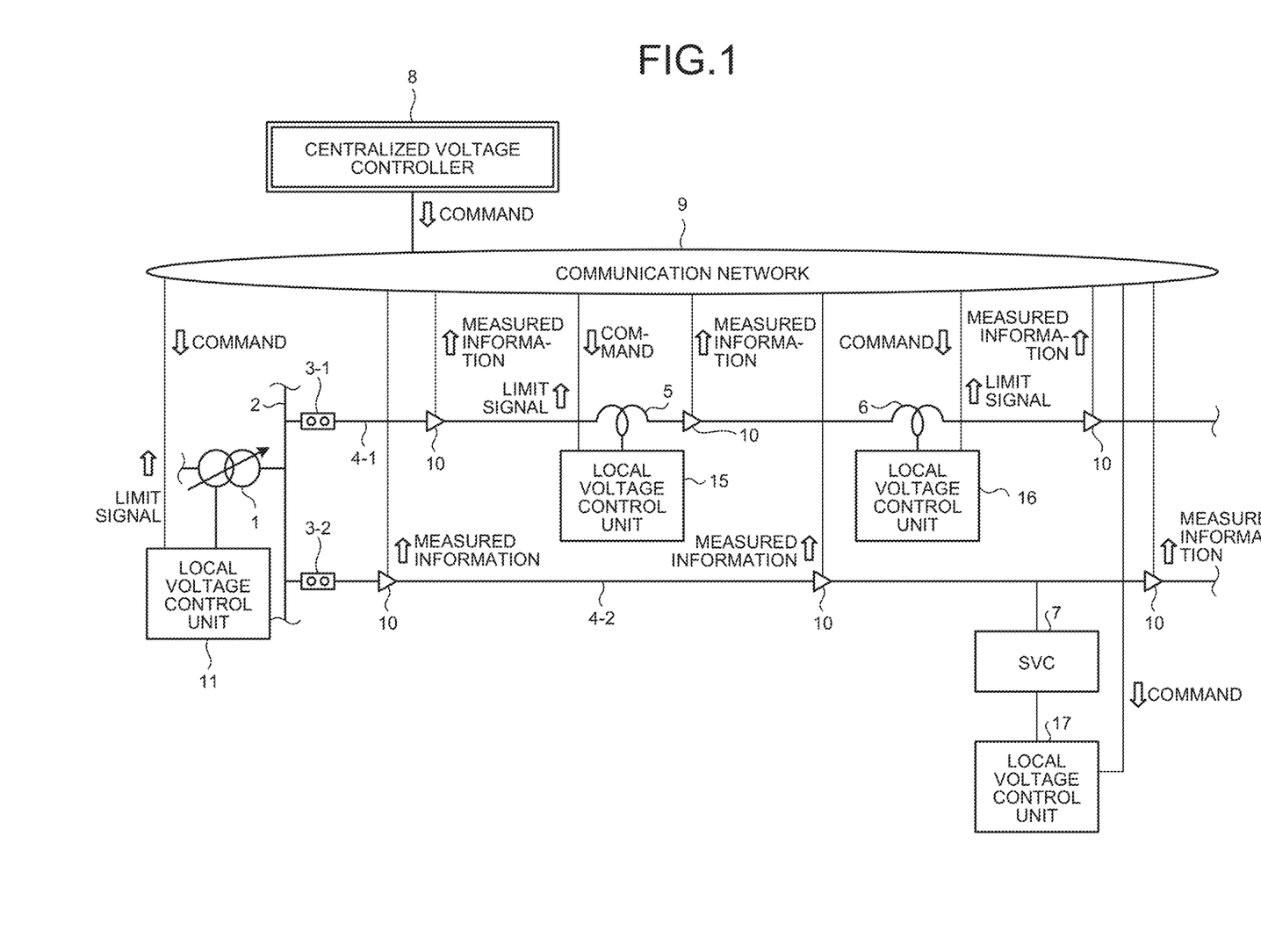
FIG. 1 is a diagram illustrating an example of a configuration of a centralized voltage control system according to an embodiment.

FIG. 1 is a diagram illustrating an example of the configuration of a centralized voltage control system according to an embodiment of the present invention. A voltage controller 1 in FIG. 1 is of a transformer type and is, for example, an LRT (load ratio control transformer: on-load tap changer type transformer) as a distribution transformer installed in an electrical substation. A local voltage control unit 11 is connected to the voltage controller 1 and controls the voltage controller 1. The local voltage control unit 11 can be integrated with or installed alongside the voltage controller 1. The local voltage control unit 11 controls the voltage controller 1 by adjusting a controlled amount of the voltage controller 1, specifically, by adjusting a tap position thereof. The local voltage control unit 11 also has a communication function and is connected to a communication network 9.

A secondary side of the voltage controller 1 is connected with a bus line 2. Two distribution lines 4-1 and 4-2 are connected in parallel to the bus line 2. The distribution lines 4-1 and 4-2 are distribution lines of a high voltage system.

The distribution line 4-1 has one end connected to the bus line 2 via a circuit breaker 3-1. At a number of points on the distribution line 4-1, voltage flow measuring devices 10 that are each a high-voltage side measuring device are installed, respectively, the voltage flow measuring device measuring the voltage and power flow of the distribution line 4-1. That is, the voltage flow measuring device 10 is connected to the distribution line 4-1, measures the voltage and power flow at its point of connection, and outputs a result obtained by processing the measured value in, for example, statistical processing or the like, as measured information. The voltage flow measuring device 10 has a communication function and is connected to the communication network 9. The voltage flow measuring device 10 transmits the measured information that is the result of measurement of the voltage and power flow to a centralized voltage controller 8 via the communication network 9, for example, on a regular basis. A cycle during which the voltage flow measuring device 10 transmits the measured information is one minute, for example. The centralized voltage controller 8 determines a targeted voltage distribution and an operating state of each voltage controller by which the targeted voltage distribution is obtained, regarding a target system range, and accordingly gives a command value to each voltage controller. Note that the centralized voltage controller 8 may be installed at a service office, a control station, or the like that takes charge of the target system range.

Voltage controllers 5 and 6 that are step voltage regulators (SVRs), which are transformer type voltage controllers, are also connected on the distribution line 4-1. A local voltage control unit 15 controlling the voltage controller 5 is connected to the voltage controller 5. The local voltage control unit 15 can be integrated with or installed alongside the voltage controller 5. The local voltage control unit 15 controls the voltage controller 5 by adjusting a controlled amount of the voltage controller 5, specifically, by adjusting a tap position thereof. Likewise, a local voltage control unit 16 controlling the voltage controller 6 is connected to the voltage controller 6. The local voltage control unit 16 controls the voltage controller 6. The local voltage control units 15 and 16 also have a communication function and are connected to the communication network 9.

The local voltage control units controlling the transformer type voltage controllers, that is, the local voltage control units 11, 15, and 16 may be local voltage control units that can transmit the tap positions set in the voltage controllers to be controlled by the units, or may be local voltage control units that do not transmit the tap positions set in the voltage controllers to be controlled by the units. Among the local voltage control units 11, 15, and 16, some may be local voltage control unit or units that can transmit the tap position while the rest may be local voltage control unit or units that do not transmit the tap position. That is, the local voltage control units 11, 15, and 16 that correspond to a plurality of local voltage control units may include a first unit as a local voltage control unit that transmits the tap position set in the voltage controller to be controlled to the centralized voltage controller 8, and a second unit as a local voltage control unit that does not transmit the tap position set in the voltage controller to be controlled to the centralized voltage controller 8. Each of the local voltage control units 11, 15, and 16 can transmit a tap limit signal indicating that a tap position reaches an upper limit or a lower limit to the centralized voltage controller 8, irrespective of whether the local voltage control unit is the first device or the second device. The tap limit signal is simply called "limit signal" below.

A voltage controller 7 that is a static var compensator (SVC) is connected to the distribution line 4-2. A local voltage control unit 17 controlling the voltage controller 7 is connected to the voltage controller 7. The local voltage control unit 17 can be integrated with or installed alongside the voltage controller 7, for example. The local voltage control unit 17 controls the voltage controller 7 by adjusting a controlled amount of the voltage controller 7, specifically, by adjusting reactive power output thereof.

One end of the distribution line 4-2 is connected to the bus line 2 via a circuit breaker 3-2. As with the distribution line 4-1, the voltage flow measuring device 10 is installed at each of a number of points on the distribution line 4-2, the device 10 measuring the voltage and power flow of the distribution line 4-2.

Although not illustrated in FIG. 1, a low voltage distribution line is connected with a load, and it is further connected with dispersion type power sources such as an electrical generator including a solar power generator and a storage battery. However, the present embodiment can be applied even when any dispersion type power source is not connected to the low voltage distribution line. Hereinafter, voltage control of the distribution system means voltage control of the high voltage system.

Note that although the number of distribution lines connected to the bus line 2 is two in the example of configuration illustrated in FIG. 1, the number of distribution lines in the high voltage system is not limited to two. Moreover, the number of voltage controllers installed and the number of voltage flow measuring devices 10 are not limited to those in the illustrated example. Furthermore, although the configuration in FIG. 1 illustrates the example in which a voltage controller of a reactive power regulation type is included as the voltage controller to be controlled by the centralized voltage controller 8, a voltage controller of a reactive power regulation type need not be included as the voltage controller to be controlled by the centralized voltage controller 8.

The centralized voltage controller 8 is connected to each of the local voltage control units 11, 15, 16, and 17 and the voltage flow measuring devices 10 via the communication network 9. The communication network 9 is a dedicated network, for example, and is provided for the purpose of monitoring and controlling the distribution system. That is, the centralized voltage controller 8 is connected to the plurality of local voltage control units via the communication network 9, the local voltage control units controlling the voltage controllers that are connected to the distribution lines of the high voltage system to control the voltage of the distribution lines. On the basis of the measured information transmitted from the voltage flow measuring devices 10, the centralized voltage controller 8 determines the controlled amount controlled by each local voltage control unit with a centralized voltage control period and gives a command of, that is, transmits, the controlled amount to each local voltage control unit individually via the communication network 9. In this way, the centralized voltage controller 8 controls the voltage controllers controlling the voltage of the high voltage distribution lines. The centralized voltage control period may be set to any value, but it is set to five minutes in the following example for description.

The centralized voltage controller 8 determines the tap positions for the local voltage control units controlling the voltage controllers of a transformer type, that is, for the local voltage control units 11, 15, and 16 in the example of FIG. 1, and gives command values based on the determined tap positions. The centralized voltage controller 8 according to the present embodiment estimates a tap position in each voltage controller and determines a command value to be given to a local voltage control unit using the estimated tap position. A method of estimating the tap position will be described later. In the present embodiment, the command value given to the local voltage control unit controlling the voltage controller of a transformer type is a change amount in the tap position. The centralized voltage controller 8 further gives an amount of reactive power as a command value to the local voltage control unit controlling the voltage controller of a reactive power regulation type, that is, to the local voltage control unit 17 in the example of FIG. 1.

Note that the centralized voltage controller 8 may be adapted not to give the command value when the tap position determined for every centralized voltage control period is not different from the command value given the last time. Alternatively, when the tap position determined for every centralized voltage control period is not different from the tap position calculated the last time, the centralized voltage controller 8 may give zero as a command value, or a change amount in the tap position.

Each local voltage control unit controlling the voltage controller of a transformer type controls the voltage controller on the basis of the command from the centralized voltage controller 8. Specifically, each local voltage control unit changes the tap position on the basis of the change amount in the tap position commanded from the centralized voltage controller 8. Each local voltage control unit does not change the tap position when the change amount in the tap position is zero. A range in which a tap position can be set is determined for each voltage controller of a transformer type. Such a settable range of tap position is called "tap position range" in the following description. In the case where the tap position is set in accordance with the change amount of the tap position indicated from the centralized voltage controller 8, when each local voltage control unit that controls the voltage controller of a transformer type determines that the tap position is an upper limit or a lower limit of the tap position range, the local voltage control unit transmits a limit signal to the centralized voltage controller 8. In the case where the tap position is set in accordance with the change amount of the tap position indicated from the centralized voltage controller 8, when the tap position is above the upper limit or below the lower limit of the tap position range, the local voltage control unit 11, 15, or 16 sets the tap position to the upper limit or the lower limit of the tap position range and transmits the limit signal to the centralized voltage controller 8. In this case, control according to the change amount of the tap position indicated from the centralized voltage controller 8 has not been executed in practice.

Figure 2:
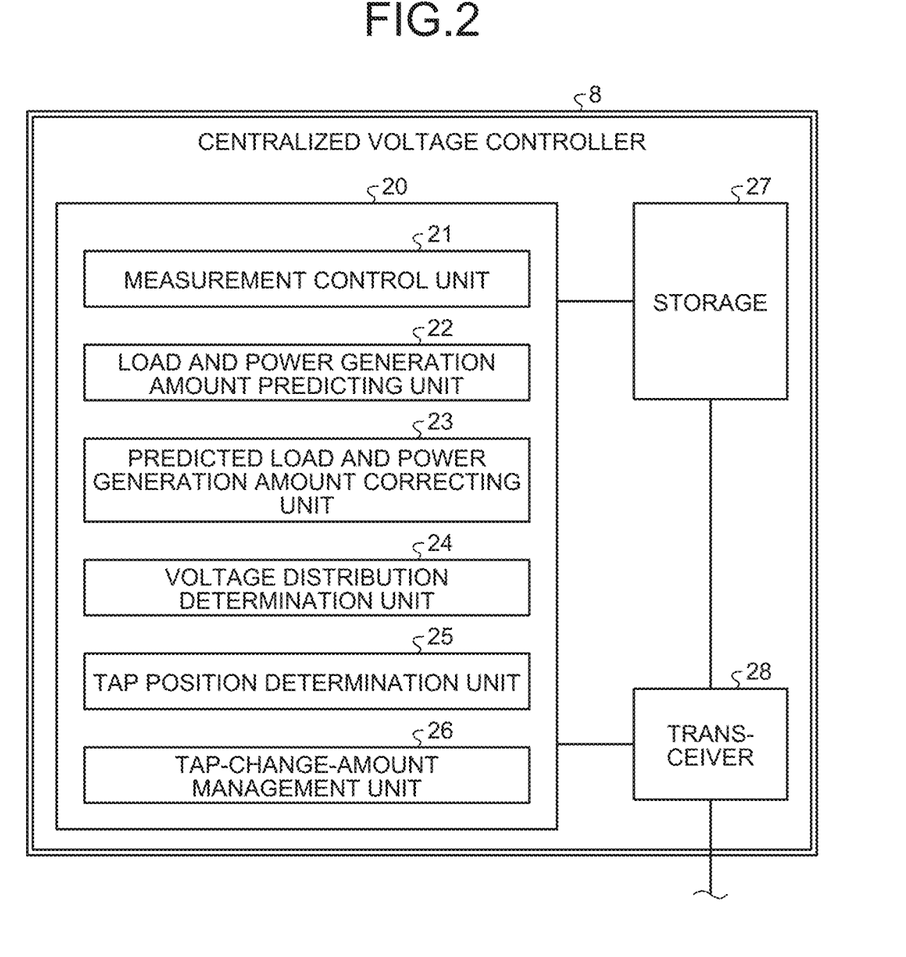
FIG. 2 is a diagram illustrating a configuration example of a centralized voltage controller.

FIG. 2 is a diagram illustrating an example of the configuration of the centralized voltage controller 8. As illustrated in FIG. 2, the centralized voltage controller 8 includes a control unit 20, a storage 27, and a transceiver 28 that is connected to the control unit 20, the storage 27, and the communication network 9 to communicate with each local voltage control unit.

The control unit 20 includes a measurement control unit 21, a load and power generation amount predicting unit 22, a predicted load and power generation amount correcting unit 23, a voltage distribution determination unit 24, a tap position determination unit 25, and a tap-change-amount management unit 26. The measurement control unit 21 stores the measured information received from the voltage flow measuring device 10 in the storage 27 and outputs the measured information to the predicted load and power generation amount correcting unit 23. The load and power generation amount predicting unit 22 predicts the load and power generation amount distribution of the distribution system for a determined period in the future such as the next day as a profile for each hour, for example. The load and power generation amount corresponds to an amount obtained by subtracting the amount of power generation from a raw load. The load and power generation amount is the amount of load when it has a positive value, but is the amount of power generation when it has a negative value. Note that details of a method of predicting the load and power generation amount distribution will be described later. The predicted load and power generation amount correcting unit 23 corrects a predicted value of the load and power generation amount distribution within a period of the centralized voltage control period on the basis of a result of comparison between an actual value of the load and power generation amount distribution within the immediately previous period of the centralized voltage control period and a predicted value of the load and power generation amount distribution within that period. Here, the actual value of the load and power generation amount distribution is calculated on the basis of the measured information.

The voltage distribution determination unit 24 performs a power flow calculation on the basis of the thus-corrected predicted value of the load and power generation amount distribution, and uses the measured information stored in the storage 27 to search for the best solution for making a value of an evaluation function that evaluates the voltage distribution of the distribution system to be the best, thereby to determine an optimum voltage distribution within the period of the centralized voltage control period and an optimum controlled amount for each voltage controller. That is, on the basis of a measured voltage value at each point of the distribution line, the voltage distribution determination unit 24 that is a calculation unit calculates the controlled amount of each of the plural voltage controllers. Note that the optimum voltage distribution is a voltage distribution at each point of the system in which a constraint condition is satisfied and the evaluation function is optimal. The optimum controlled amount is a controlled amount commanded to each voltage controller to achieve the optimum voltage distribution. The optimum controlled amount for the local voltage control unit corresponding to the voltage controller of a reactive power regulation type is the amount of reactive power outputted by the voltage controller. The command value for the local voltage control unit corresponding to the voltage controller of a reactive power regulation type is the controlled amount itself. The optimum controlled amount for the local voltage control unit corresponding to the voltage controller of a transformer type is a tap position.

On the basis of the optimum voltage controlled amount, the tap position determination unit 25 that is a command unit determines a command value for a local voltage control unit corresponding to a voltage controller of a transformer type, and issues the command value to each local voltage control unit via the transceiver 28. This command value is a change amount of a tap position in the case of the local voltage control unit corresponding to the voltage controller of a transformer type. That is, for the local voltage control unit corresponding to the voltage controller of a transformer type, the tap position determination unit 25 determines a change amount of a tap position to be indicated to each of the local voltage control units on the basis of the controlled amount. As described later, for each local voltage control unit corresponding to a voltage controller of a transformer type, the storage 27 stores therein tap information that indicates a tap position currently set in the voltage controller of a transformer type. The tap position determination unit 25 determines the change amount of the tap position for each local voltage control unit corresponding to the voltage controller of a transformer type on the basis of the optimum controlled amount and the tap information stored in the storage 27.

The tap-change-amount management unit 26 manages a tap position of a voltage controller of a transformer type. In more detail, when receiving the tap position from a local voltage control unit that can transmit a tap position, the tap-change-amount management unit 26 updates the tap information stored in the storage 27 on the basis of the received tap position. For a local voltage control unit that cannot transmit a tap position, the tap-change-amount management unit 26 estimates the tap position in tap position estimation processing described later, and updates the tap information on the basis of the estimated tap position. The tap-change-amount management unit 26 also updates the tap information on the basis of the command value determined by the tap position determination unit 25. Detailed descriptions of updating the tap information will be provided later.

The storage 27 stores therein upper limit and lower limit values of a high-voltage proper voltage range at each point in a distribution system. The storage 27 also stores therein a control limit of each voltage controller connected to the distribution system. Further, the storage 27 stores therein tap information that indicates a tap position for each local voltage control unit corresponding to a voltage controller of a transformer type, as described above.

Figure 3:
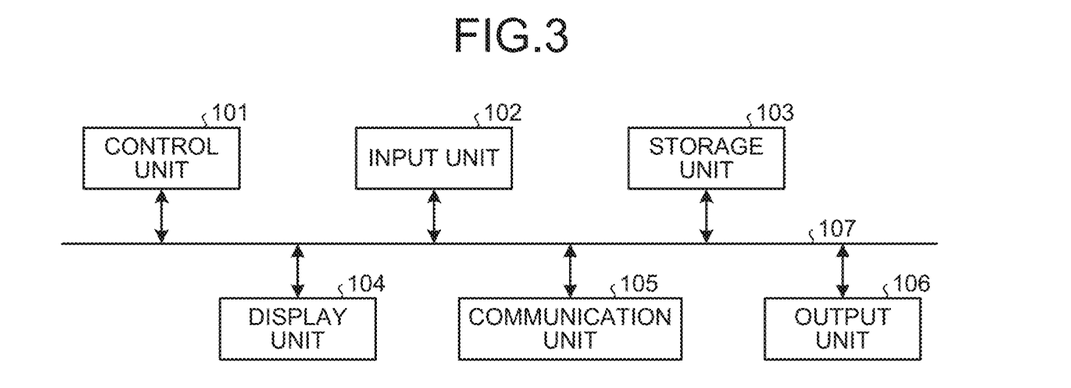
FIG. 3 is a diagram illustrating a configuration example of a computer system.

The centralized voltage controller 8 is specifically a computer system, that is, a computer. The computer system functions as the centralized voltage controller 8 when a centralized voltage control program is run on the computer system. FIG. 3 is a diagram illustrating an example of the configuration of the computer system of the present embodiment. As illustrated in FIG. 3, the computer system includes a control unit 101, an input unit 102, a storage unit 103, a display unit 104, a communication unit 105, and an output unit 106, which are connected to each other via a system bus 107.

In FIG. 3, the control unit 101 is a processor such as a central processing unit (CPU), and executes the centralized voltage control program of the present embodiment. The input unit 102 includes a keyboard and a mouse, for example, and is used by a user of the computer system to input various kinds of information. The storage unit 103 includes various kinds of memories based on a random access memory (RAM) and a read only memory (ROM) as well as a storage device such as a hard disk, and stores a program to be executed by the control unit 101, necessary data obtained in the course of processing, and the like. The storage unit 103 is also used as a temporary storage area for the program. The display unit 104 is constructed of a display, a liquid crystal display (LCD) panel, or the like and displays various kinds of screens to the user of the computer system. The communication unit 105 is a set of transmitter and receiver that carries out communication processing. The output unit 106 is an output port that can be connected to a printer, for example. Note that FIG. 3 illustrates an example and the configuration of the computer system is not limited to the example of FIG. 3.

Here, a description will be given of an example of the operation of the computer system until the centralized voltage control program of the present embodiment is executable. The centralized voltage control program is installed to the storage unit 103 of the computer system having the above configuration from, for example, a Compact Disc (CD)-ROM or a Digital Versatile Disc (DVD)-ROM set in a CD-ROM or DVD-ROM drive not illustrated. When executed, the centralized voltage control program read from the storage unit 103 is stored in the storage unit 103. In this state, the control unit 101 executes centralized voltage control processing of the present embodiment according to the program stored in the storage unit 103.

Note that although the present embodiment provides the program describing the centralized voltage control processing in the CD-ROM or DVD-ROM as a recording medium, use may be made of the program provided through a transmission medium such as the Internet via the communication unit 105, for example, depending on the configuration of the computer system, the size of the program provided, and the like.

The control unit 20 illustrated in FIG. 2 is implemented by the control unit 101 in FIG. 3. The storage 27 illustrated in FIG. 2 is a part of the storage unit 103 illustrated in FIG. 3. The transceiver 28 illustrated in FIG. 2 corresponds to the communication unit 105 illustrated in FIG. 3.

Figure 4:
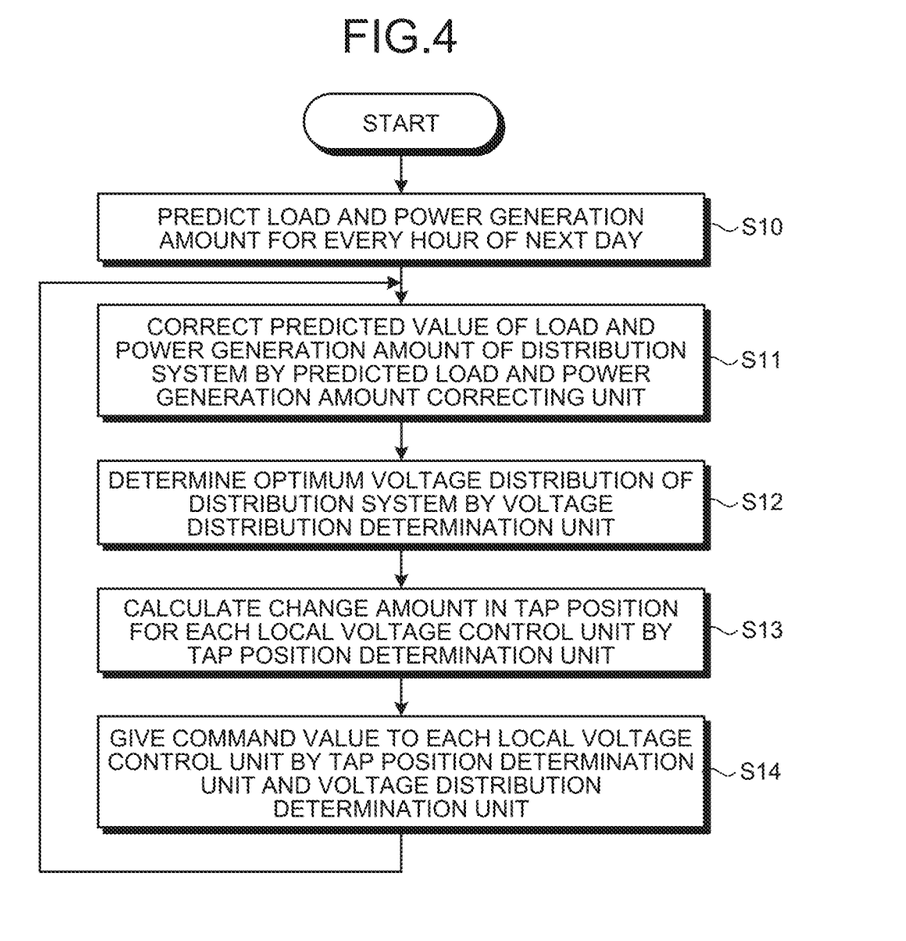
FIG. 4 is a flowchart illustrating an example of a centralized voltage control processing procedure.

Next, centralized voltage control by the centralized voltage controller 8 of the present embodiment will be described. FIG. 4 is a flowchart illustrating an example of a centralized voltage control processing procedure of the present embodiment. In the present embodiment, a future load and power generation amount distribution of the distribution system is predicted for each day. Note that although a future load and power generation amount distribution of the distribution system is predicted every day in the example described herein, the future load and power generation amount distribution of the distribution system may be predicted every half day or every few days instead of every day. Here, the future load and power generation amount distribution of the distribution system is predicted every day.

As illustrated in FIG. 4, the load and power generation amount predicting unit 22 predicts the load and power generation amount distribution of the distribution system for every hour of the next day, for example, and a short period variation thereof from the load and power generation amount data at each point of the distribution system stored in the storage 27 (step S10). Note that the load and power generation amount predicting unit 22 obtains the load and power generation amount at each point of the distribution system by taking a difference between average values of the power flow in adjacent measurement points on the basis of the measured information received from the voltage flow measuring device 10, which is received in the past and stored in the storage 27. The load and power generation amount distribution is predicted by performing this process for each point of the distribution system. The load and power generation amount at each point of the distribution system is stored in the storage 27 as the load and power generation amount data. The load and power generation amount data is updated as appropriate on the basis of the measured information. The load and power generation amount data need not be calculated on the basis of the measured information, but may be determined on the basis of a model that is calculated based on facility data indicating which facility and load are disposed in which part or parts of the distribution line, a contract demand corresponding to each load, and/or the panel capacity of a solar power plant, for example.

The load and power generation amount predicting unit 22 collects actual load amounts for two or more days, for example, and obtains in advance a correlation between the load amount and air temperature in the same time period for each day of the week or each of weekday/holiday categories. This correlation is held by means of a relational expression obtained by a regression analysis or the like, or a table, or by other means like that. Then, from the correlation and a predicted air temperature for the next day, the load and power generation amount predicting unit 22 predicts the load amount at each point of the distribution system for each hour of the next day. As for the power generation amount of the next day, theoretical power generation amount based on prediction of weather for the next day is used, and the load and power generation amount predicting unit 22 subtracts the predicted power generation amount from the predicted load amount to produce the load and power generation amount data at each point of the distribution system for every hour of the next day.

Next, the predicted load and power generation amount correcting unit 23 corrects the predicted value of the load and power generation amount of the distribution system (step S11). Specifically, the predicted load and power generation amount correcting unit 23 compares an average value of the load and power generation amount at each point of the distribution system in a past determined time period between an actual value and a predicted value calculated on the basis of the measured information received from the voltage flow measuring device 10 in the most recent determined time period to obtain a ratio between the actual value and the predicted value, and multiplies the predicted value of the load and power generation amount in a future determined time period by the ratio, so as to correct the predicted value of the load and power generation amount at each point of the system in the future determined time period. The determined time period corresponds to a centralized voltage control period, for example.

Next, the voltage distribution determination unit 24 determines the optimum voltage distribution of the distribution system in the future determined time period on the basis of the predicted value of the load and power generation amount at each point of the distribution system, which has been produced in step S11 (step S12). Note that the processing of correcting the predicted value of the load and power generation amount in step S11 may be omitted, and the voltage distribution determination unit 24 may determine the optimum voltage distribution of the distribution system for one hour in the future on the basis of the predicted value of the load and power generation amount at each point of the distribution system for the next day, which has been produced in step S10.

Next, on the basis of the controlled amount, namely the optimum controlled amount, which is used as a basis for calculation of the optimum voltage distribution of the distribution system and the tap information, the tap position determination unit 25 calculates a change amount in the tap position, which is a command value given to each local voltage control unit in the future determined time period (step S13).

The tap position determination unit 25 and the voltage distribution determination unit 24 then give the command value to each local voltage control unit controlling the voltage controller (step S14), and returns to step S11. Specifically, the tap position determination unit 25 and the voltage distribution determination unit 24 transmit the command value to each local voltage control unit via the transceiver 28. As described above, the command value for each local voltage control unit controlling the voltage controller of a reactive power regulation type is the amount of reactive power, whereas the command value for each local voltage control unit controlling the voltage controller of a transformer type is the change amount in the tap position. Steps S11 to S14 are repeated for each centralized voltage control period.

Figure 5:
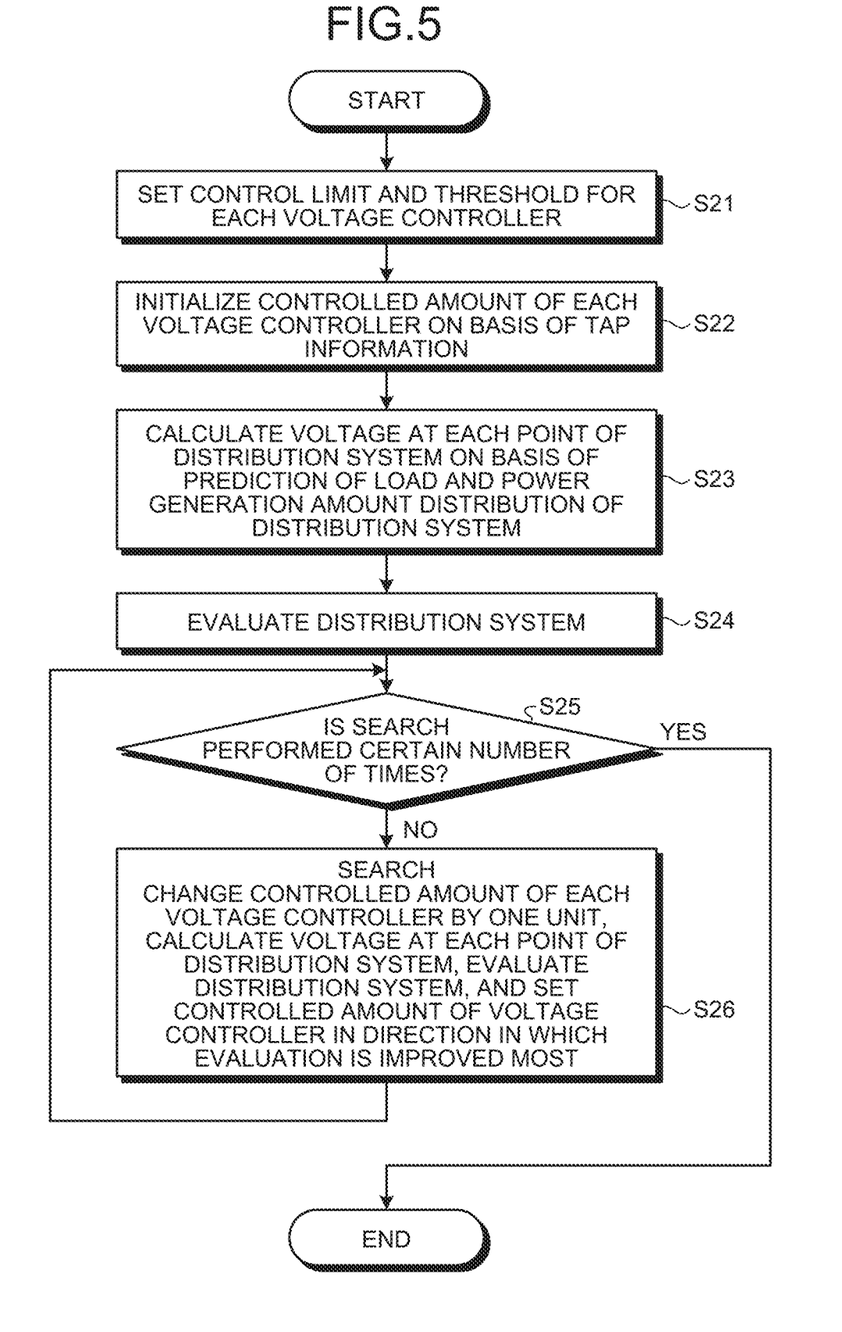
FIG. 5 is a flowchart for explaining details of processing in step S12 of FIG. 4.

Next, the details of the processing in step S12 of FIG. 4 will be described. FIG. 5 is a flowchart for explaining the details of the processing in step S12 of FIG. 4 and illustrates a flow for calculating the optimum voltage distribution of the distribution system in the future determined time period.

First, the voltage distribution determination unit 24 sets a control limit for each voltage controller, or when taking an example, sets tap upper and lower limits and a threshold for a voltage margin in the case of the voltage controller of a transformer type (step S21). Here, the control limit of each voltage controller is assumed to be stored in the storage 27. An arbitrary value can be set as the threshold for the voltage margin. The voltage distribution determination unit 24 also reads upper and lower limit values of the high-voltage proper voltage range for each point from the storage 27.

Figure 6:
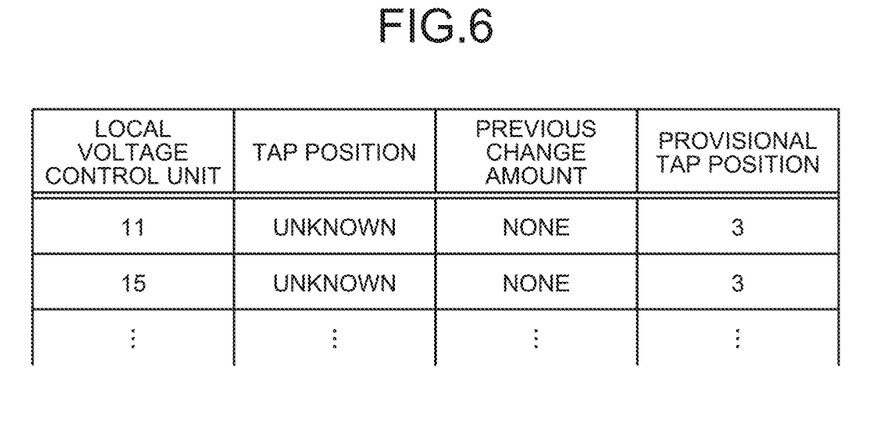
FIG. 6 is a diagram illustrating an example of the structure of tap information.

Next, the voltage distribution determination unit 24 initializes the controlled amount of each voltage controller on the basis of the tap information (step S22). FIG. 6 is a diagram illustrating an example of a structure of the tap information. The tap information includes identification information indicating the local voltage control unit, a tap position, a previous change amount, and a provisional tap position for each local voltage control unit that controls a voltage controller of a transformer type.

The tap position in the tap information indicates a fixed tap position, and information indicating that it is unknown is stored as an initial value. For a local voltage control unit that can transmit a tap position, the tap position in the tap information is updated by the tap-change-amount management unit 26 by reception of the tap position from the local voltage control unit. For a local voltage control unit that cannot transmit a tap position, the tap position in the tap information is updated when the tap position is determined by tap position estimation processing described later. After the tap position is determined once, the tap information is updated as for the tap position in accordance with a command value. The previous change amount in the tap information indicates the latest value of a change amount of a tap position indicated as a command value. This change amount also includes information indicating a direction of change, that is, information indicating whether change in a tap position is change in a direction of raising the tap or change in a direction of lowering the tap. In the example illustrated in FIG. 6, the directions of changing the tap position are indicated by positive and negative signs. That is, the + sign added to a value of the previous change amount indicates that the tap has been raised previously, and the − sign added to the value of the previous change amount indicates that the tap has been lowered previously.

The provisional tap position in the tap information is used in a state where the tap position in the tap information is unknown, and is set to a tap position at the center of a tap position range or to a neutral value as an initial value thereof, for example. FIG. 6 illustrates an example of tap information in an initial state, that is, a state where a tap position has not been received from a local voltage control unit and the tap position has not been determined by tap position estimation processing, before start of centralized voltage control. In the example illustrated in FIG. 6, the tap position has not been determined. For this reason, "unknown" is stored for the tap position, and "3" indicating the third step that is a tap position at the center of the tap position range is stored for the provisional tap position. For the previous change amount, information indicating that there is no previous change amount is stored, because centralized voltage control has not started yet and so no command value has been transmitted. The structure of the tap information illustrated in FIG. 6 is merely an example. The order of items stored in the tap information, the specific format of each information, and the like are not limited to those in the example illustrated in FIG. 6.

As for a voltage controller of a transformer type, if a tap position in tap information of a local voltage control unit corresponding to the voltage controller is not "unknown", the voltage distribution determination unit 24 sets the tap position in the tap information to an initial controlled amount in step S22. For a voltage controller of a transformer type, if the tap position in the tap information of the local voltage control unit corresponding to the voltage controller is "unknown", the voltage distribution determination unit 24 sets the provisional tap position in the tap information to the initial controlled amount in step S22.

As for a voltage controller of a reactive power regulation type, the voltage distribution determination unit 24 sets a controlled amount of each voltage controller to an initial value or a previous controlled amount in the initial setting in step S22. The initial value of a reactive power amount of the voltage controller of a reactive power regulation type is zero, for example.

Next, on the basis of the prediction about the load and power generation amount distribution at each point of the distribution system, the voltage distribution determination unit 24 performs power flow calculation with the set controlled amount of each voltage controller to calculate the voltage at each point of the distribution system (step S23).

The voltage distribution determination unit 24 then evaluates the distribution system on the basis of a result of the power flow calculation (step S24). Specifically, the voltage distribution determination unit 24 evaluates the distribution system by evaluating the evaluation function set for an evaluation item of the distribution system, that is, a value of an objective function. Here, the evaluation item given a first priority is an amount of violation, that is, an amount of deviation of the voltage at each point of the distribution system from the high-voltage proper voltage range (a high-voltage proper voltage upper limit value and a high-voltage proper voltage lower limit value). That is, the optimum voltage distribution is determined to minimize the sum total of the amount of violation of the voltage at each point of the distribution system from the proper voltage range in the first place.

The evaluation item given a second priority is, for example, a voltage margin at each point of the distribution system, that is, an amount of margin with respect to the high-voltage proper voltage upper/lower limit value. When each point of the distribution system has a small voltage margin, the voltage deviates from the proper voltage range with a slight voltage fluctuation and thereby the voltage controller may operate frequently. Thus, the larger the sum total of the voltage margin, the higher the evaluation. In a case of using an evaluation function showing an optimum when taking the minimum value, the voltage margin is evaluated using a voltage margin decrease amount defined as follows. The voltage margin decrease amount is calculated using the following expression (1) to be zero when the voltage margin is sufficiently large and to increase as the voltage margin decreases.

Voltage margin decrease amount=threshold−voltage margin, where voltage margin<threshold Voltage margin decrease amount=0, where voltage margin>=threshold (1)

The threshold is the value set in step S21, and is set to about 20% of the width of the proper voltage range, for example.

The case where the voltage margin<threshold and the voltage value is within the proper voltage range does not result in deviation from the proper voltage range, that is, a voltage violation, but results in a voltage margin violation, that is, a state in which the voltage margin for a short period variation is not secured, and therefore voltage margin>=threshold is desired.

The evaluation item given a third priority can be a sum total of the change amount in the controlled amount of the voltage controller from a default value thereof. Here, the change amount in the controlled amount of the voltage controller from the default value thereof is a difference in the tap position from a default tap position in the case of the voltage controller of a transformer type. Reduction in the sum total of the change amount leads to reduction in the number of times the voltage controller is operated.

The evaluation item given a fourth priority can be a transmission loss (active power loss+reactive power loss) of the entire distribution system. The smaller the transmission loss, the higher the evaluation. Note that the transmission loss consists mostly of the active power loss and its loss amount decreases as the voltage increases but accordingly the voltage margin on the upper limit side at each point of the distribution system given the second priority becomes smaller, and so the transmission loss is an evaluation item that is meaningful when the upper and lower voltage limit values at each point of the distribution system have considerable margins.

The evaluation function may be set for the evaluation item given the first priority, but it can be set for two or more of the items given the first to fourth priorities. In the latter case, the evaluation functions are weighted and summed to be an overall evaluation function. A higher order priority item can also be included in the evaluation function depending on the distribution system. The evaluation function can be constructed to be best optimized (highest evaluation) when taking the minimum value, for example.

For instance, when the evaluation function is set on the basis of all the evaluation items given the first to fourth priorities, the evaluation function can be defined as the following expression (2). "Wp", "W1", "W2", and "W3" are weight coefficients.

$$\text{Evaluation function value} = \text{sum total of violation amount of upper and lower voltage limits at each point of distribution system} \times Wp + \text{maximum value of voltage margin decrease amount on upper limit side at each point within a responsible voltage control range for each transformer} \times W1 + \text{maximum value of voltage margin decrease amount on lower limit side at each point within a responsible voltage control range for each transformer} \times W1 + \text{transformer target voltage change amount from previous command incidence} \times W2 + \text{transmission loss} \times W3 \quad (2)$$

Returning to the explanation of FIG. 5, the voltage distribution determination unit 24 determines whether or not a determined number of times of searches, that is, the search of step S26 is performed (step S25), and ends the processing if the search has been performed the determined number of times (Yes in step S25), but proceeds to processing of step S26 if the search is not performed the determined number of times (No in step S25).

Next, in step S26, the voltage distribution determination unit 24 changes the controlled amount of each voltage controller by, for example, one unit to calculate the voltage at each point of the distribution system as in step S23 and evaluate the distribution system as in step S24, and compares the evaluation results after carrying out the controlled-amount changing process for calculation and evaluation for all the voltage controllers, so as to set the controlled amount of the voltage controller so that the evaluation is improved most significantly (step S26). Changing the controlled amount by one unit means to raise or lower the tap by one step in a case of the voltage controller of a transformer type, or means to increase or decrease the amount of reactive power by a determined amount in a case of the voltage controller of a reactive power regulation type. For the optimization algorithm, a method disclosed in Japanese Patent Application Laid-open No. 2010-250599 or the like can be used, for example. The processing returns to step S25 after the execution of step S26.

In step S26, for a voltage controller of a transformer type, the voltage distribution determination unit 24 refers to tap information and a tap position range of the voltage controller and, when a tap position in the tap information is an upper limit or a lower limit, the unit 24 limits a direction of changing a controlled amount and a change amount thereof. As for the direction of changing the controlled amount, the voltage distribution determination unit 24 limits the direction only to a direction of lowering the tap when the tap position in the tap information is the upper limit. When the tap position in the tap information is the lower limit, the voltage distribution determination unit 24 limits the direction of changing the controlled amount only to a direction of raising the tap. Also, when the tap position in the tap information is the upper or lower limit, the voltage distribution determination unit 24 limits the change amount only to one step of change.

After a search is performed a determined number of times in the manner described above, the voltage distribution determination unit 24 can determine an optimum voltage distribution in a distribution system and an optimum controlled amount for each voltage controller in a future determined time period as the best solution by which the value of an evaluation function is made the best.

Figure 7:
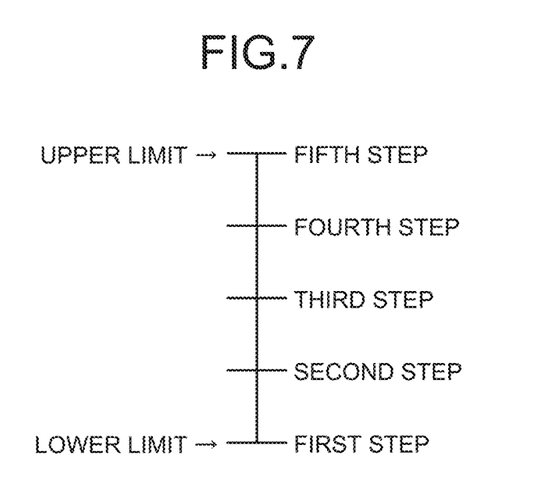
FIG. 7 is a diagram illustrating an example of a tap position range.

Next, tap position estimation processing of the present embodiment will be described. FIG. 7 is a diagram illustrating an example of a tap position range. In the example illustrated in FIG. 7, a tap position range is illustrated in the case where a tap can be set in five steps including first to fifth steps by a voltage controller of a transformer type. The first step is a lower limit of a tap position and the fifth step is an upper limit of the tap position in this example.

A local voltage control unit that controls a voltage controller of a transformer type having the tap position range illustrated in FIG. 7 sets a tap position in accordance with a command value received from the centralized voltage controller 8, and when the tap position of the voltage controller of a transformer type becomes at the first step as a result of the setting, the local voltage control unit transmits a limit signal to the centralized voltage controller 8. In addition, the local voltage control unit sets the tap position in accordance with the command value received from the centralized voltage controller 8, and when the tap position in the voltage controller of a transformer type becomes at the fifth step as a result of the setting, this local voltage control unit transmits a limit signal to the centralized voltage controller 8.

Further, when the tap position deviates from the tap position range if the tap position is changed in accordance with the command value received from the centralized voltage controller 8, this local voltage control unit transmits a limit signal to the centralized voltage controller 8. In this case, since the local voltage control unit cannot change the tap position in accordance with the command value received from the centralized voltage controller 8, the local voltage control unit sets the tap position to a closest tap position to the tap position obtained in accordance with the command value, that is, a tap position corresponding to the upper limit or the lower limit. Specifically, when receiving a command to raise the tap by two steps from the centralized voltage controller 8 in a state where the tap position is set to the fourth step, for example, the local voltage control unit sets the tap position to the fifth step that is the upper limit of the tap position range and transmits the limit signal to the centralized voltage controller 8.

The limit signal includes information for identifying a local voltage control unit. The centralized voltage controller 8 holds a correspondence relation between a local voltage control unit and its corresponding voltage controller in the storage 27 and also holds information indicating a tap position range for each voltage controller in the storage 27. The information indicating the tap position range is information indicating the number of settable steps, for example, and in other words, information indicating that the tap position can be set in five steps in the example illustrated in FIG. 7.

The centralized voltage controller 8 uses a tap position in a voltage controller of a transformer type to calculate an optimum voltage distribution in centralized voltage control as described above. However, some voltage controllers are not notified of a tap position. Even in a voltage controller that are not notified of a tap position, a limit signal is transmitted as described above. Therefore, the centralized voltage controller 8 determines a tap position of a voltage controller of a transformer type using the limit signal in the present embodiment.

The limit signal, in general, does not include information for distinguishing whether the tap position has reached the upper limit or the lower limit. For this reason, the centralized voltage controller 8 cannot determine, only upon receiving the limit signal, whether the tap position of a voltage controller corresponding to the limit signal is the upper limit or the lower limit of the tap position range. In the present embodiment, when receiving the limit signal, the centralized voltage controller 8 determines whether the tap position of the voltage controller corresponding to the limit signal is the upper limit or the lower limit on the basis of a command value previously given.

Next, tap position estimation processing in the centralized voltage controller 8 of the present embodiment will be described. When receiving, from a local voltage control unit, a limit signal indicating that a tap position of a voltage controller controlled by the local voltage control unit is an upper limit or a lower limit of a settable range, that is, a tap position range, the tap-change-amount management unit 26 that is a limiting unit updates tap information to limit a change amount to be determined by the tap position determination unit 25, that is, a change amount of the tap position. More specifically, when receiving a limit signal, the tap-change-amount management unit 26 performs tap position estimation processing described later to thereby determine whether a tap position of a voltage controller controlled by a local voltage control unit that is a transmission source of the limit signal is an upper limit or a lower limit, and then to update a tap position in tap information on the basis of the determination result. Thereafter, the voltage distribution determination unit 24 calculates an optimum voltage distribution on the basis of the updated tap information, and the tap position determination unit 25 calculates a change amount of the tap position on the basis of the optimum voltage distribution. Accordingly, the change amount of the tap position is limited by the updated tap information.

Figure 8:
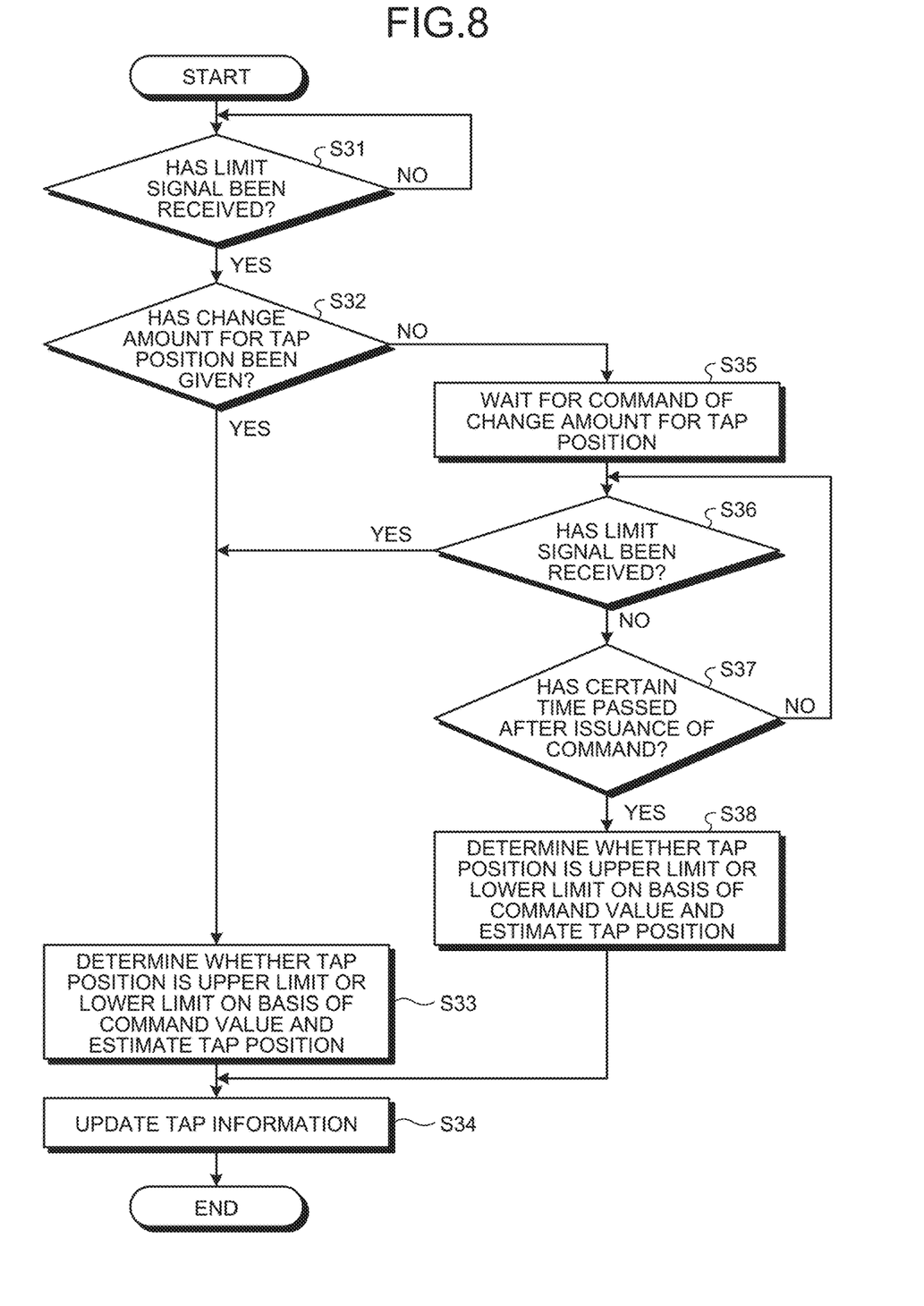
FIG. 8 is a flowchart illustrating an example of a tap position estimation processing procedure in the centralized voltage controller.

FIG. 8 is a flowchart illustrating an example of a tap position estimation processing procedure in the centralized voltage controller 8 of the present embodiment. As illustrated in FIG. 8, the centralized voltage controller 8 determines whether it has received a limit signal (step S31). Specifically, when receiving a limit signal from a local voltage control unit, the transceiver 28 of the centralized voltage controller 8 passes the limit signal to the tap-change-amount management unit 26. The tap-change-amount management unit 26 determines whether or not the limit signal has been received on the basis of whether or not the limit signal has been taken in.

If the limit signal has not been received (No in step S31), step S31 is repeated. If the limit signal has been received (Yes in step S31), the centralized voltage controller 8 determines whether or not a change amount of a tap position has been given to a local voltage control unit that is a transmission source of the received limit signal (step S32). A case where the change amount of the tap position has not been given to the local voltage control unit makes a state before start of centralized voltage control or a state in which the centralized voltage control has been started but the change amount has not been given because a tap position corresponding to the local voltage control unit has not been changed. Also in the case where the centralized voltage control has been started and only zero has been given as the change amount of the tap position corresponding to the local voltage control unit, the centralized voltage controller 8 determines that the change amount of the tap position has not been given to the local voltage control unit. If the centralized voltage controller 8 has given the change amount of the tap position other than zero once or more, it determines that the change amount of the tap position has been given to the local voltage control unit. Specifically, when the tap-change-amount management unit 26 refers to a previous change amount in the tap information, for example, and a value other than zero, that is, a positive or negative value is stored in the previous change amount, the tap-change-amount management unit 26 then determines that the change amount of the tap position has been given to the local voltage control unit.

When determining that the change amount of the tap position has been given to the local voltage control unit that is a transmission source of the received limit signal (Yes in step S32), the centralized voltage controller 8 determines whether the tap position is an upper limit or a lower limit on the basis of the command value and estimates the tap position (step S33).

Specifically, when the tap-change-amount management unit 26 refers to the previous change amount corresponding to the local voltage control unit that is the transmission source of the received limit signal in the tap information, and the previous change amount is a positive value, the tap-change-amount management unit 26 then determines that the tap position is an upper limit of a tap position range of a voltage controller controlled by the local voltage control unit. On the other hand, when the tap-change-amount management unit 26 refers to the previous change amount corresponding to the local voltage control unit that is the transmission source of the received limit signal in the tap information, and the previous change amount is a negative value, the tap-change-amount management unit 26 then determines that the tap position is a lower limit of the tap position range of the voltage controller controlled by the local voltage control unit. The tap-change-amount management unit 26 estimates the tap position in the voltage controller on the basis of information indicating the tap position range of the voltage controller and the result of determination whether the tap position is the upper limit or the lower limit. For example, in a case where the information indicating the tap position range of the voltage controller indicates that the tap position can be set in five steps, if the result of determination whether the tap position is the upper limit or the lower limit is the upper limit, the tap-change-amount management unit 26 estimates that the tap position in the voltage controller is the fifth step.

Next, the centralized voltage controller 8 updates the tap information (step S34) and ends the tap position estimation processing. Specifically, the tap-change-amount management unit 26 updates the tap position in the tap information to a value indicating the estimated tap position. In addition, when the tap position in the tap information is no longer "unknown" as a result of updating to the estimated value, the tap-change-amount management unit 26 may update a provisional tap position to an invalid value.

Figure 9:
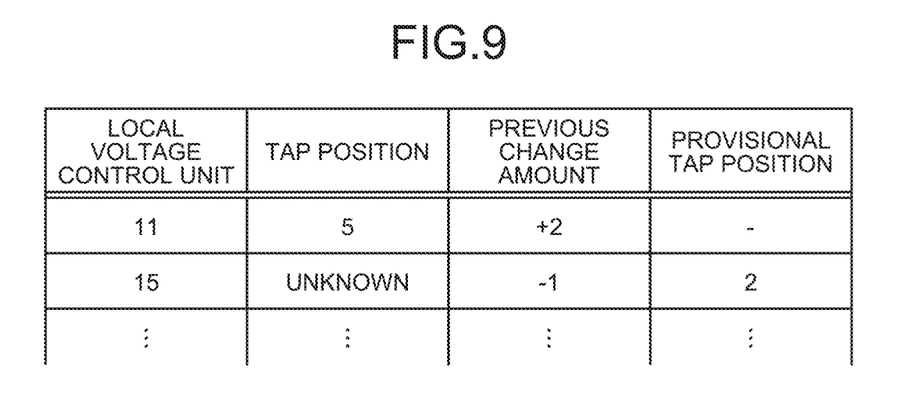
FIG. 9 is a diagram illustrating an example of updated tap information.

FIG. 9 is a diagram illustrating an example of updated tap information. FIG. 9 illustrates an example in which the tap information illustrated in FIG. 7 in an initial state is updated. FIG. 9 illustrates an example in which, by centralized voltage control, a command value to raise a tap by two steps is transmitted to the local voltage control unit 11 and a command value to lower a tap by one step is transmitted to the local voltage control unit 15, and thereafter the centralized voltage controller 8 receives a limit signal from the local voltage control unit 11. As for the local voltage control unit 11, the limit signal has been received and a previous change amount is +2. From these facts, the tap-change-amount management unit 26 of the centralized voltage controller 8 determines that a tap position of the voltage controller 1 controlled by the local voltage control unit 11 is an upper limit. A tap position is assumed to be settable in five steps in the voltage controllers 1 and 5 as illustrated in FIG. 7. Accordingly, the tap-change-amount management unit 26 estimates that the tap position in the voltage controller 1 is the fifth step, and updates a tap position in tap information of the local voltage control unit 11 that is a local voltage control unit corresponding to the voltage controller 1 to 5 that is the upper limit. The tap-change-amount management unit 26 also updates a provisional tap position in the tap information of the local voltage control unit 11 to a value indicating that it is invalid (represented as "-" in FIG. 9).

As for the local voltage control unit 15, the third step that is a center tap position is set as a provisional tap position in an initial state as illustrated in FIG. 7, and the tap position is lowered by one step by a previous command value. Accordingly, the provisional tap position is 2. The tap position determination unit 25 generates a command value in step S13 described above, and thereupon updates the previous command value in the tap information in accordance with the command value and raises or lowers the tap position or the provisional tap position in the tap information. Specifically, when the tap position in the tap information is "unknown", the tap position determination unit 25 raises or lowers the provisional tap position in accordance with the command value. When the tap position in the tap information is not "unknown", the tap position determination unit 25 raises or lowers the tap position in the tap information in accordance with the command value.

In a case of No in step S32, the centralized voltage controller 8 waits for a command of a change amount of a tap position (step S35). Specifically, the centralized voltage controller 8 waits until the command value has been transmitted to a local voltage control unit that is a transmission source of the limit signal received in step S31 by the centralized voltage control. In the case where the command value is transmitted even when the change amount is zero, the centralized voltage controller 8 waits until a command value whose change amount is not zero has been transmitted.

Subsequently, the centralized voltage controller 8 determines whether it has received a limit signal from the local voltage control unit that is the transmission source of the limit signal received in step S31 (step S36). If the centralized voltage controller 8 has received the limit signal (Yes in step S36), the process proceeds to step S33. Because the tap position determination unit 25 updates the previous change amount of the tap information for each transmission of the command value as described above, a positive or negative value is stored in the previous change amount at the time at which the process proceeds to step S33 after steps S35 and S36. Accordingly, it is possible to determine the upper limit or the lower limit on the basis of the previous change amount in step S33.

If the limit signal has not been received in step S36 (No in step S36), the tap-change-amount management unit 26 determines whether or not a determined time has passed after issuance of a command (step S37). If the determined time has not passed after issuance of the command (No in step S37), the centralized voltage controller 8 returns to step S36. If the determined time has passed after issuance of the command (Yes in step S37), the centralized voltage controller 8 determines whether, at the time when the limit signal received in step S31 is transmitted by a local voltage control unit, a tap position in a voltage controller controlled by the local voltage control unit has been an upper limit or a lower limit on the basis of the previously-given command value, and estimates the tap position (step S38). Specifically, when the previous command value has raised the tap position, the limit signal is no longer received because of raising of the tap. Therefore, the tap-change-amount management unit 26 determines that, at the time of transmission of the limit signal received in step S31, the tap position in the voltage controller controlled by the local voltage control unit has been the lower limit. Further, the previous change amount is stored in the tap information as described above. Therefore, the tap-change-amount management unit 26 can estimate that the tap position in the voltage controller controlled by the local voltage control unit is a tap position that has been changed from the lower limit by the previous change amount.

When the previous command value has lowered the tap position, the limit signal is no longer received because of lowering of the tap. Therefore, the tap-change-amount management unit 26 determines that, at the time of transmission of the limit signal received in step S31, the tap position in the voltage controller controlled by the local voltage control unit has been the upper limit. Further, the previous change amount is stored in the tap information as described above. Therefore, the tap-change-amount management unit 26 can estimate that the tap position in the voltage controller controlled by the local voltage control unit is a tap position changed from the upper limit by the previous change amount.

After step S38, the centralized voltage controller 8 proceeds to step S34. As described above, the tap-change-amount management unit 26 performs determination processing for determining whether the tap position is the upper limit or the lower limit of a range in which the limit signal can be set, on the basis of the previously-given change amount. Tap information is updated on the basis of the result of this determination, and subsequent centralized voltage control is executed on the basis of the updated tap information. In this manner, a direction of changing a tap position in a change amount corresponding to a local voltage control unit that is a transmission source of the limit signal is determined in accordance with the result of the determination processing. Further, the tap-change-amount management unit 26 calculates an estimated value of a tap position in a voltage controller controlled by the local voltage control unit that is the transmission source of the limit signal on the basis of the result of the determination processing. The voltage distribution determination unit 24 calculates a controlled amount using the estimated value, and the tap position determination unit 25 updates the estimated value on the basis of the determined change amount, as described before.

If the centralized voltage controller 8 has received a limit signal before transmitting a command value, that is, before executing the centralized voltage control, the centralized voltage controller 8 cannot determine whether the tap position is an upper limit or a lower limit because there is no previous change amount of a tap position. However, after waiting for transmission of a command value by centralized voltage control, the centralized voltage controller 8 can estimate the tap position by performing processing of step S36 and the subsequent steps after transmission of the command value.

Although the centralized voltage controller 8 limits a change amount of a tap position to one step when the tap position is an upper limit or a lower limit in the example described above, the change amount of the tap position may be limited to one step irrespective of whether the tap position is the upper limit or the lower limit. In this case, even when a provisional tap position is different from an original tap position, it is possible to avoid a state where a tap position in a voltage controller is not a tap position according to a command value. Specifically, in the case where change by two steps or more is allowed as a change amount of a tap position, if change by two steps or more is commanded, a tap position according to the command may not be set in some cases because the tap position is above the upper limit or below the lower limit. Unlike this case, by limiting the change amount of the tap position to one step, a limit signal is transmitted at the time when the tap position reaches the upper limit or the lower limit even if a provisional tap position is different from the original tap position, so that the correct tap position is reflected in the following processing in the centralized voltage controller 8, thereby making it possible to perform proper voltage control.

Even in the case where change by two steps or more is allowed as the change amount of the tap position, the correct tap position is reflected on control in the next voltage control period after the limit signal has been transmitted, so that a period in which voltage control according to a command value is not executed in a local voltage control unit is limited. For this reason, there is no practical problem even if change by two steps or more is allowed as the change amount of the tap position.

In addition, when the limit signal is received, the processes in steps S11 to S14 may be performed without waiting for steps S11 to S14 in the next voltage control period. This configuration enables appropriate voltage control to be immediately executed, even if change by two steps or more is allowed as the change amount of the tap position and voltage control according to the command value has not been executed.

Figure 10:
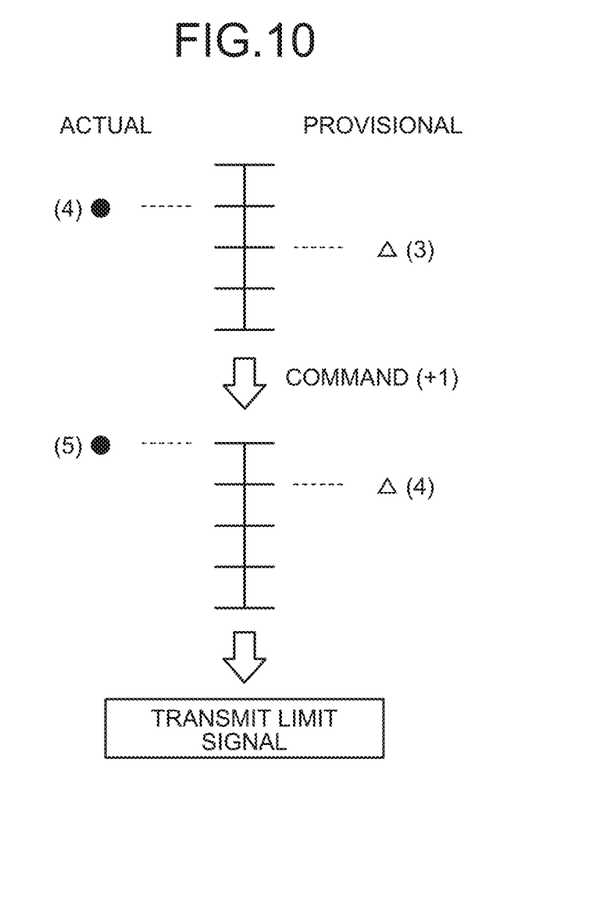
FIG. 10 is an explanatory diagram of advantageous effects of the embodiment.

FIG. 10 is an explanatory diagram of advantageous effects of the present embodiment. FIG. 10 illustrates a tap position range of the voltage controller 1 in which a tap position can be set in five steps, as in the example illustrated in FIG. 7.

It is assumed that, as illustrated in an upper portion in FIG. 10, a provisional tap position in the voltage controller 1 is at the third step that is the center of the tap position range, denoted with a white triangle, and an actual tap position in the voltage controller 1 is at the fourth step denoted with a black circle at the time of starting the centralized voltage control. In this state, it is further assumed that a command to raise the tap by one step has been transmitted to the local voltage control unit 11 that controls this voltage controller 1 in the centralized voltage control. Then, as illustrated in a lower portion of FIG. 10, the provisional tap position in the voltage controller 1 becomes at the fourth step denoted with a white triangle, and the actual tap position in the voltage controller 1 becomes at the fifth step denoted with a black circle. Accordingly, the local voltage control unit 11 transmits a limit signal.

In the case of not performing the tap position estimation processing described above, after the state shown in the lower portion in FIG. 10, the centralized voltage control is continued with the tap position of the voltage controller 1 being at the fourth step. In contrast, in the present embodiment, after the state shown in the lower portion in FIG. 10, the centralized voltage controller 8 performs the tap position estimation processing in response to reception of a limit signal. Accordingly, after the tap position estimation processing, the centralized voltage control is executed with the tap position in the voltage controller 1 being at the fifth step that corresponds to the actual tap position. By this configuration, it is possible to execute voltage control more appropriately than in the case of not performing the tap position estimation processing.

Although the centralized voltage controller 8 limits a change amount of a tap position to one step when the tap position is an upper limit or a lower limit in the example described above, the change amount of the tap position may be allowed to be set to two steps or more. In the case of allowing the change amount of the tap position to be two steps or more when the tap position is the upper limit or the lower limit, there is a possibility that the tap position is not set in accordance with a command value temporarily, as described above. However, after the tap position is estimated once, the centralized voltage control is executed properly in response to reception of a limit signal, and there is therefore no practical problem. Note that although the above embodiment describes a high voltage system as an example, the present invention can be similarly applied to a low voltage system.

The configurations illustrated in the above embodiment merely illustrate examples of the content of the present invention, and can thus be combined with other publicly known techniques or partially omitted and/or modified without departing from the scope of the present invention.

REFERENCE SIGNS LIST 1, 5, 6, 7 voltage controller; 2 bus line; 3-1, 3-2 circuit breaker; 4-1, 4-2 distribution line; 8 centralized voltage controller; 9 communication network; voltage flow measuring device; 11, 15, 16, 17 local voltage control unit; 20 control unit; 21 measurement control unit; 22 load and power generation amount predicting unit; 23 predicted load and power generation amount correcting unit; 24 voltage distribution determination unit; 25 tap position determination unit; 26 tap-change-amount management unit; 27 storage; 28 transceiver.

The invention claimed is:

1. A centralized voltage controller connected to two or more local voltage controllers via a communication network, the local voltage controllers controlling two or more transformer type voltage controllers, respectively, the transformer type voltage controllers being connected to a distribution line of a distribution system and controlling a voltage of the distribution line, the centralized voltage controller comprising:
a processor; and
a memory storing one or more instructions that, when executed by the processor, cause the centralized voltage controller to:
calculate a controlled amount in each of the voltage controllers on the basis of a measured value of a voltage at each point of a plurality of points on the distribution line;
determine a change amount of a tap position to be given to each of the local voltage controllers on the basis of the controlled amount; and
limit the change amount when receiving, from the local voltage controllers, a limit signal indicating that a tap position of the voltage controller controlled by the local voltage controller is an upper limit or a lower limit of a settable range in which the tap position can be set, wherein the limit signal is triggered by the tap position of the voltage controller reaching the upper limit, and wherein the same limit signal is triggered by the tap position of the voltage controller reaching the lower limit,
perform determination processing that determines whether the limit signal indicates the upper limit or the lower limit of the settable range on a basis of the change amount previously given and independent of a current value of the tap position of the voltage controller, and
determine a direction of changing the tap position in the change amount corresponding to the local voltage controller that is a transmission source of the limit signal in accordance with a result of the determination processing.

2. The centralized voltage controller according to claim 1, wherein the one or more instructions, when executed by the processor, further cause the centralized voltage controller to:
calculate an estimated value of the tap position of the voltage controller controlled by the local voltage controller that is the transmission source of the limit signal on the basis of the result of the determination processing,
calculate the controlled amount using the estimated value, and
update the estimated value on the basis of the determined change amount.

3. A centralized voltage controller connected to two or more local voltage controllers via a communication network, the local voltage controllers controlling two or more transformer type voltage controllers, respectively, the transformer type voltage controllers being connected to a distribution line of a distribution system and controlling a voltage of the distribution line, the centralized voltage controller comprising:
a processor; and
a memory storing one or more instructions that, when executed by the processor, cause the centralized voltage controller to:
calculate a controlled amount in each of the voltage controllers on the basis of a measured value of a voltage at each point of a plurality of points on the distribution line;
determine a change amount of a tap position to be given to each of the local voltage controllers on the basis of the controlled amount; and
limit the change amount when receiving, from the local voltage controller, a limit signal indicating that a tap position of the voltage controller controlled by the local voltage controller is an upper limit or a lower limit of a settable range in which the tap position can be set, wherein the limit signal is triggered by the tap position of the voltage controller reaching the upper limit, and wherein the same limit signal is triggered by the tap position of the voltage controller reaching the lower limit,
wherein the change amount corresponding to the local voltage controller that is a transmission source of the limit signal is limited to one tap position when the tap position of the voltage controller is the upper limit or the lower limit.

4. A centralized voltage control system comprising:
a plurality of transformer type voltage controllers, connected to a distribution line of a distribution system, to control a voltage of the distribution line;
a plurality of local voltage controllers to control the voltage controllers, respectively; and
a centralized voltage controller connected to the local voltage controllers via a communication network, wherein
the centralized voltage controller includes:
a processor; and
a memory storing one or more instructions that, when executed by the processor, cause the centralized voltage controller to:
calculate a controlled amount in each of the voltage controllers on the basis of a measured value of a voltage at each point of a plurality of points on the distribution line;
determine a change amount of a tap position to be given to each of the local voltage controllers on the basis of the controlled amount; and
limit the change amount, when receiving, from the local voltage controller, a limit signal indicating a tap position of the voltage controller controlled by the local voltage controller is an upper limit or a lower limit of a settable range in which the tap position can be set, wherein the limit signal is triggered by the tap position of the voltage controller reaching the upper limit, and wherein the same limit signal is triggered by the tap position of the voltage controller reaching the lower limit,
perform determination processing that determines whether the limit signal indicates the upper limit or the lower limit of the settable range on a basis of the change amount previously given and independent of a current value of the tap position of the voltage controller, and
determine a direction of changing the tap position in the change amount corresponding to the local voltage control unit that is a transmission source of the limit signal in accordance with a result of the determination processing.

* * * * *